United States Patent [19]

Lister et al.

[11] Patent Number: 5,351,630

[45] Date of Patent: Oct. 4, 1994

[54] APPARATUS FOR CONDITIONING ASTM CLASS C FLY ASH

[75] Inventors: Robert A. Lister; William H. Barrow; James B. Merkel, all of San Antonio; Gary W. Beckcom, Boerne; I Samuel Young, San Antonio, all of Tex.

[73] Assignee: Monex Resources, Inc., San Antoni, Tex.

[21] Appl. No.: 725,204

[22] Filed: Jul. 3, 1991

[51] Int. Cl.$^5$ ................................. F23J 1/00
[52] U.S. Cl. ................................. 110/165 A; 106/706; 106/DIG. 1; 588/256; 264/DIG. 49
[58] Field of Search ............... 110/165 A, 240; 414/397; 298/22 R, 23 R; 296/184; 264/DIG. 49; 106/706, DIG. 1; 588/256; 232/43.1; 49/483

[56] References Cited

U.S. PATENT DOCUMENTS

| | | | |
|---|---|---|---|
| 2,712,797 | 7/1955 | Woehrle et al. | 298/23 R X |
| 4,374,672 | 2/1983 | Funston et al. | 106/706 |
| 4,472,198 | 9/1984 | Nowicki et al. | 106/706 |
| 4,545,523 | 10/1985 | Galbreath et al. | 232/43.1 |
| 4,790,250 | 12/1988 | Turner | 110/165 A |
| 4,875,420 | 10/1989 | Hay et al. | 110/240 X |
| 5,021,156 | 6/1991 | Sloan | 298/22 R X |
| 5,051,031 | 9/1991 | Schumacher et al. | 106/706 X |
| 5,057,009 | 10/1991 | Nechvatal et al. | 110/165 A X |

FOREIGN PATENT DOCUMENTS 295083  11/1916  United Kingdom ........... 110/165 A

Primary Examiner—Edward G. Favors
Attorney, Agent, or Firm—Limbach & Limbach

[57] ABSTRACT

A hydrated granular fly ash composition is disclosed. The granular fly ash may be transported with minimal dust problems while maintaining its capacity to act as a solidifying agent at a remote destination. The process for producing the fly ash involves evenly dispersing a pre-determined amount of water into the fly ash so that it is transformed into a granular form substantially eliminating dust production. An apparatus for processing the fly ash includes a hopper for receiving the fly ash, a conveyor and a modified conditioner in which the fly ash is hydrated.

3 Claims, 4 Drawing Sheets

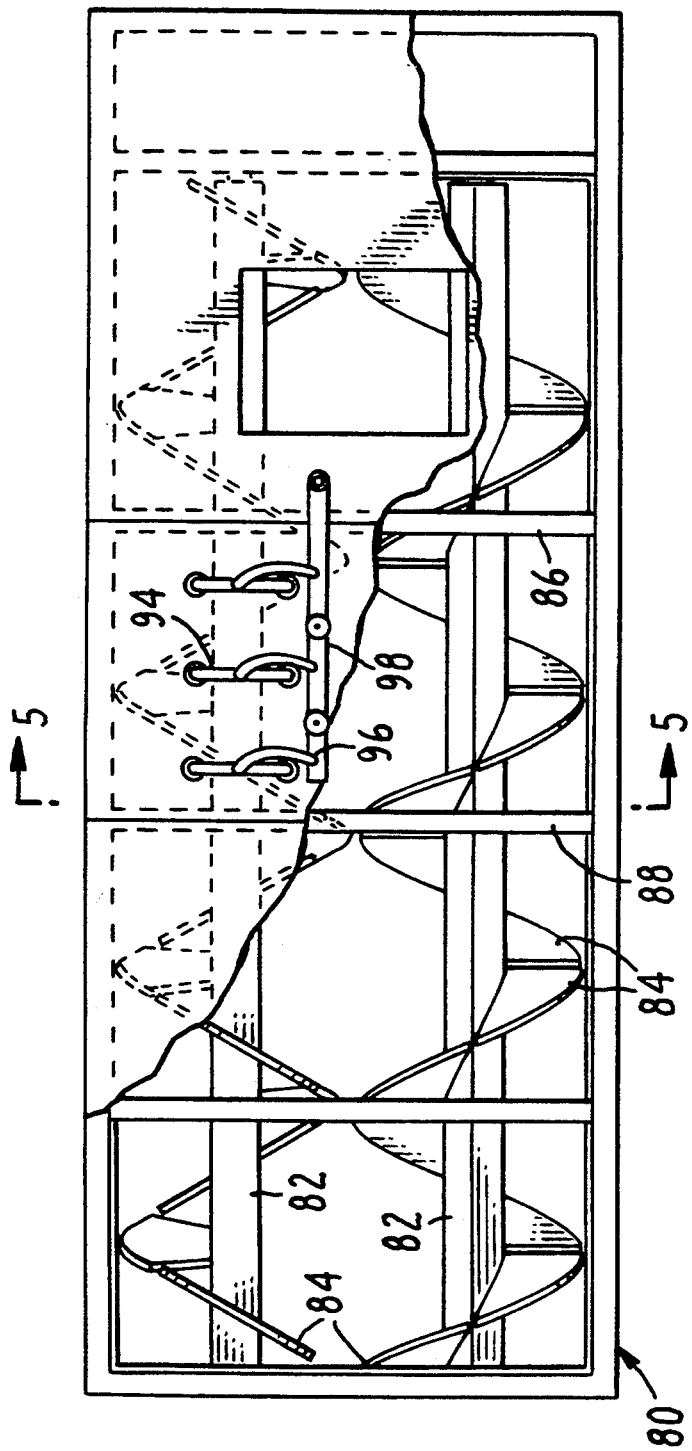
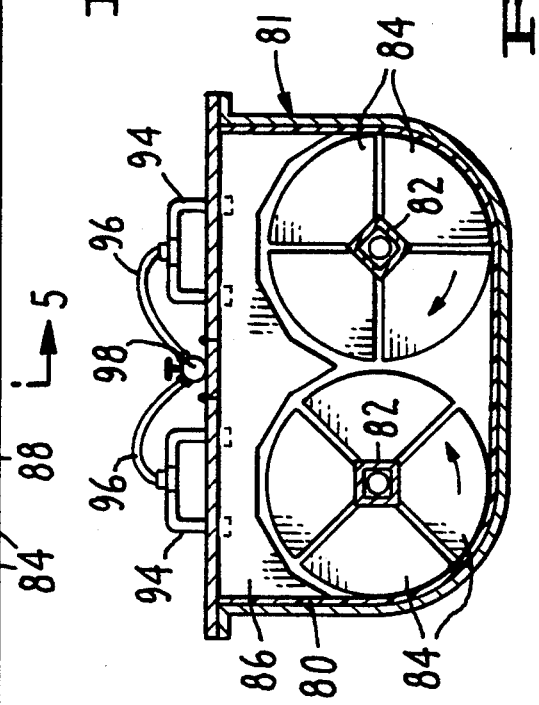

APPARATUS FOR CONDITIONING ASTM CLASS C FLY ASH

FIELD OF THE INVENTION

The invention relates to conditioning ASTM Class C fly ash from coal burning power stations. In particular, the invention involves an apparatus and method for uniformly agglomerating fly ash by controlled water addition, allowing efficient transportation for disposal or other use.

BACKGROUND OF THE INVENTION

Self hardening ASTM Class C fly ash, hereafter referred to as "fly ash", results primarily from the burning of pulverized coal mined from the Powder River basin in Wyoming. Fly ash contains various compounds including calcium, silicon, aluminum and iron oxides, and tends to rapidly gel and harden when mixed with water. The self-hardening characteristic makes fly ash useful for solidifying sludge material including non-hazardous or hazardous wastes. Fly ash is also useful when mixed with road base materials to stabilize and solidify road base materials in preparation for surface treatment and placement of the finish surface material (bituminus asphalt, etc.). As used herein, "solidifying agent" means a flowable fly ash which can be hardened upon the addition of water with or without the addition of mineral fillers such as earth and stone aggregates.

One major problem with the use of fly ash is that it is difficult to transport, except in totally enclosed tank type cars or trailers, without producing substantial quantities of airborne dust. The small size and spherical shape of the fly ash particles and its relatively low density make it especially prone to extreme dust problems. One way of preventing dust production is to add water to the fly ash. However, if an excessive amount of water is added, the fly ash will solidify making it hard to dispose of and practically useless as a solidifying agent for future combination with waste or road bed materials.

Most of the prior wet methods for controlling fly ash dust require a water filled pond. Variations include (1) underwater discharge from pressurized pneumatic tanker trucks, (2) slurry discharge from the power plant into an ash pond, and (3) discharge from pneumatic tankers through slurry mixers at the ash pond. There are several problems with these methods. First, once the fly ash is immersed in the pond it is useless for future mixing with waste or road base materials. Second, these methods yield a very low disposed ash density, meaning that the unit cost for pond volume will be significantly higher than for dry disposal methods. Third, use of a water filled pond creates the potential for hazardous subterranean leaching problems and utilizes high volumes of water.

Other wet methods have been tried. For example, one approach involves dry hauling and dumping followed by wetting with a water truck and mixing with a dozer blade. A principal problem with this method is that dozer blade mixing is messy and imprecise. Another wet method involves wetting with conventional ash conditioners at the silos followed by hauling of the moistened material to the landfill. This method requires starting and stopping a silo based conditioner each time a truck is loaded. Starting and stopping the conditioner causes variations in the water to ash ratio leading to inconsistent product treatment and equipment blockage. The material is very difficult to unload from trucks because it tends to stick and harden in the trucks.

Therefore, due to these and other problems which are unsolved by the prior art, an object of the present invention is to provide a substantially dust-free fly ash composition which is amenable to being easily transported for efficient disposal or use as a solidifying agent with waste or building materials.

It is also an object to provide a method for processing fly ash which substantially prevents dust production without causing the fly ash to fully harden, thus maintaining the fly ash' capacity to act as a solidifying agent.

Another object is to develop an apparatus for carrying out the new process. It is desireable that the apparatus be mobile so that the process can be carried out at various sites which may be remote from the coal burning station.

SUMMARY OF THE INVENTION

The composition of the present invention includes approximately 9–12% (w/w) water evenly dispersed in fly ash. When the appropriate amount of water is evenly mixed into the fly ash with agitation, it becomes substantially agglomerated into granules or pellets, thus minimizing dust problems.

The method for producing the conditioned fly ash involves use of an apparatus including a conveyor and a conditioner which has a water supply for treating the fly ash. The water addition point is fixed at a location in the conditioner. By controlling the amount of fly ash carried by the conveyor, the speed of the conveyor and the rate at which water is dispensed from the water source, the ratio of water to fly ash can be precisely controlled.

In a preferred embodiment the apparatus is mounted on a trailer so that it is fully mobile. This allows it to be moved during or between periods of operation. Thus the apparatus can be placed at any desired location and the apparatus does not have to be shut off merely because a truck has been loaded or a pile of processed fly ash has reached a maximum height.

The apparatus also includes a conditioner. The conditioner has a polyethylene lined tub, a plurality of paddles for mixing and moving the fly ash through the tub, and a plurality of spray nozzles connected to a water supply for treating the fly ash as it translates through the conditioner.

BRIEF DESCRIPTION OF THE DRAWINGS

FIG. 4 is a top cut-away view of the conditioner portion of an embodiment of the present invention.

FIG. 5 is a sectional end view of the conditioner portion of an embodiment of the present invention.

DETAILED DESCRIPTION OF THE PREFERRED EMBODIMENTS

Figure 1:
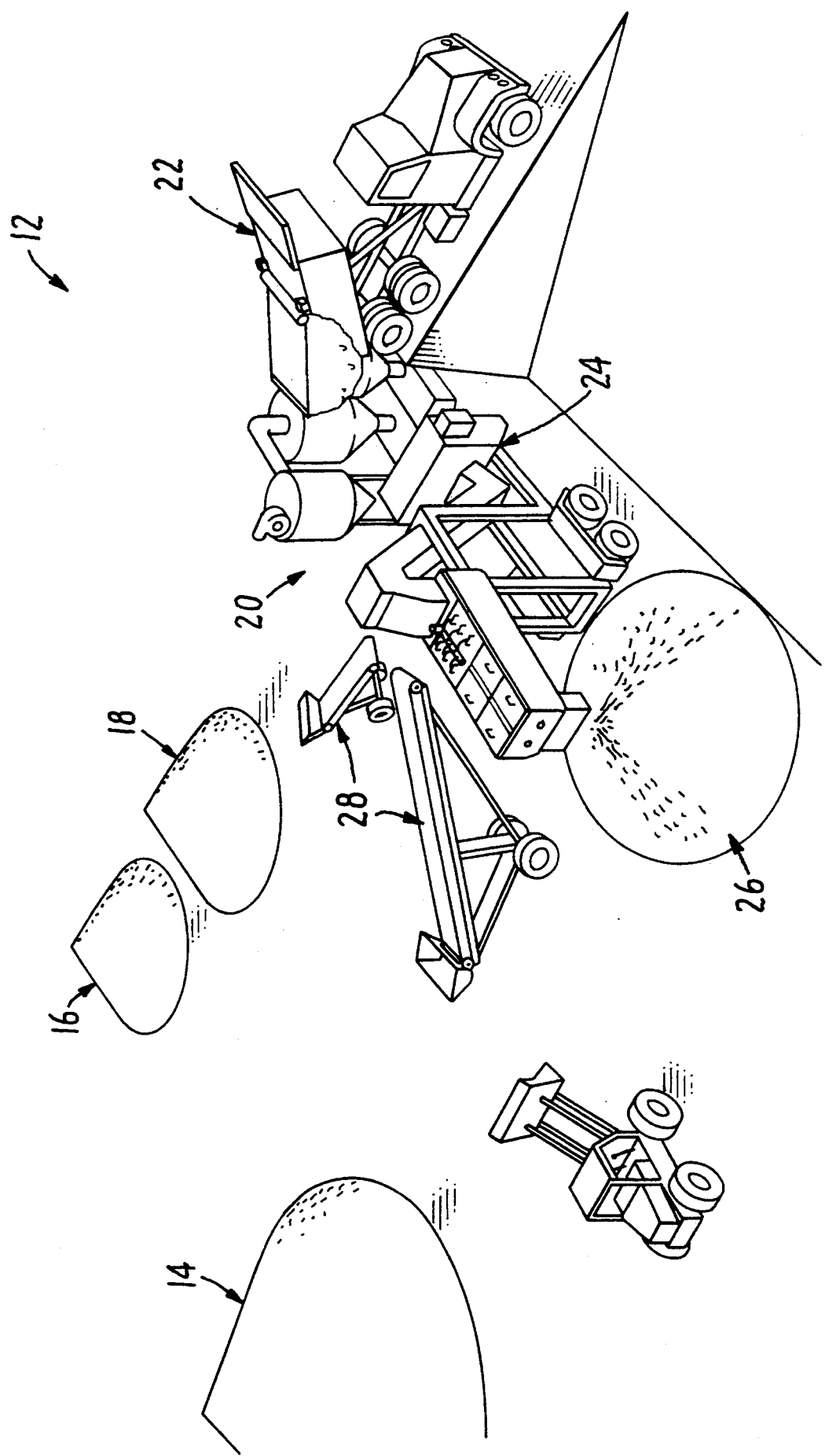
FIG. 1 is a perspective view of the apparatus of the present invention as used in a remote fly ash dump site.

The present invention involves ASTM Class C fly ash ("fly ash"). Fly ash is comprised of extremely small low density particles which are spherical in shape. Therefore, the untreated fly ash is prone to becoming airborne, making transport difficult and creating unacceptable work conditions because of the airborne fly ash. Fly ash is primarily glassy silicates which are reported as various oxide equivalents. The primary components are typically silicon dioxide, aluminum oxide and calcium oxide. A recent analysis of a fly ash sample yielded the following composition data: 35.0% silicon dioxide, 20.7% aluminum oxide, 5.2% iron oxide, 26.2% calcium oxide, 5.5% magnesium oxide and 1.8% sulfur trioxide.

The composition of the present invention is a uniform mixture of fly ash and a carefully controlled amount of water, mixed into a granular form. The water content of the composition is preferably just high enough to achieve the granular physical form which is much less prone to producing dust in comparison to the untreated fly ash, yet low enough to substantially preserve the cementitious properties of the dry fly ash.

The preferred moisture content range for the composition of the present invention is between 9.5% and 12%. The preferred moisture amount is 10%. At a moisture content below 9.5% the excessive dust problems still exist. If more than 12% water is used, the conditioned fly ash loses its product value because much of its cementitious reactivity is lost.

It is also sometimes desirable to include an additive in the conditioned fly ash. For some applications it is advantageous to add a "retarding agent" to slow down the cementitious properties of the dry fly ash. For example, MC-1 which is a lignin product having a 20-25% solids content available from Monex Resources of San Antonio, Tex. works well for this purpose. MC-1 is preferably added upstream from the spray nozzles by injecting it into the water supply at a rate of one part MC-1 to 100 parts water. To insure good distribution, the MC-1 is metered as it is pumped into the water supply to the ash conditioning machine.

The conditioned fly ash composition is used for three principle purposes. First, the fly ash composition may be used to solidify or fix wastes and sludges. The composition is mixed with wastes and sludges either as a single additive or in combination with other additives such as cement, lime, cement kiln dust or lime kiln dust. The waste or sludge mixture is then either: 1) chemically reacted to fix the individual elements of the waste or sludge to produce an inert mass, 2) solidify the waste and sludge to make a solid mass, or 3) dry the waste and sludge to produce a material that can be easily handled for shipment or other processing purposes.

Second the composition may be used as a binder in road base. In this application, the composition is blended with poor quality base materials to provide the paste or glue to bind the base materials together. In such a road construction process, the composition may be the single additive or may be used in conjunction with either cement or lime.

A third use for the composition is to provide an advanced method for the disposal of excess fly ash in landfills. The composition of the present invention, allows disposal in an environmentally preferred dustless method. It also eliminates the need to flood the ash with excess water, such as in many of the prior art methods.

FIG. 1 shows a typical fly ash remote dump site 12 at which the mobile fly ash conditioning process of the present invention is being performed. As noted above, fly ash is useful as a solidifying agent for combination with various materials, such as road base materials 14, or sludge or waste materials 16. Such combination is often performed at a dump site 12, as shown in FIG. 1.

In order to produce the composition of the present invention, it is necessary to precisely and control the amount of water which is added to the fly ash. The mobile ash conditioning system of the present invention is designed to achieve this objective.

The conditioning process of the present invention 20 is initiated by delivering loads of fly ash from a dump truck 22. The fly ash is received by a mobile ash conditioning machine 24. The mobility of the fly ash conditioning machine 24 allows the same machine to produce conditioned fly ash 26 at any number of different locations within a single dump site, or at completely different geographical locations. Auxiliary feed hoppers 28 may also be used to blend other materials into the fly ash during the conditioning process.

Figure 2:
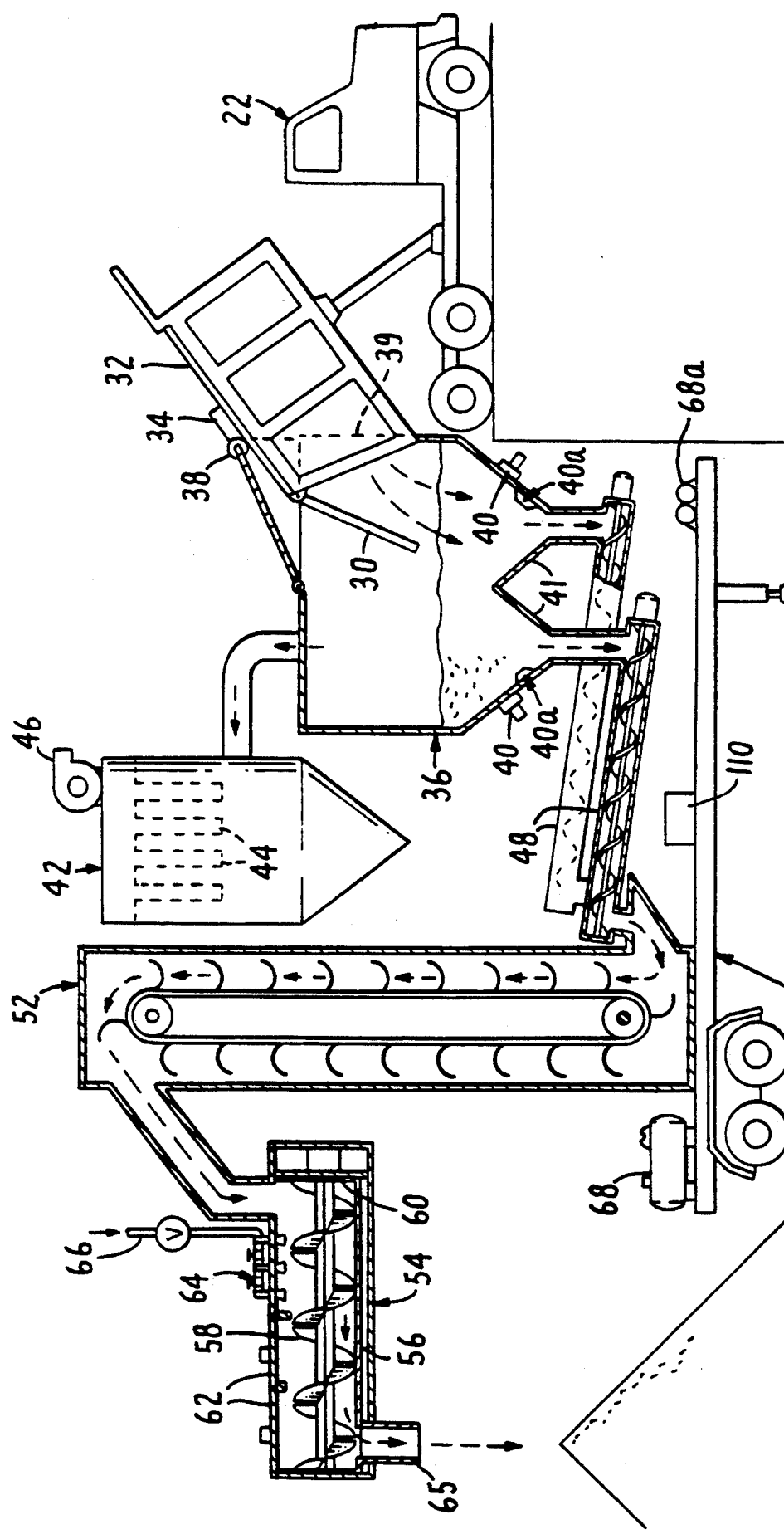
FIG. 2 is a schematic side view of the apparatus of the present invention.

FIG. 2 shows the various apparatus components of the present invention and how the actual conditioning process is performed. As mentioned with reference to FIG. 1, the conditioning is initiated by dumping a load of fly ash from a dump truck 22. In a preferred mode for practicing the invention, the dump truck 22 is fitted with a sealed pivoting tailgate 30 which has a foam rubber gasket and metal indentation strip to provide watertight sealing of the tailgate. The dump truck carrier cover 32 is a rigid metal or fiberglass lid which is sealed and clamped to the top of the bed. This lid design allows quick removal by a front end loader. The lid 32 is also equipped with a hatch 34 for loading dry fly ash from a power plant silo.

The fly ash is dumped from the dump truck 22 into a hopper 36. As shown in FIG. 2, the hopper 36 has a two truck load capacity with a door seal 38 and flexible curtain 39. The hopper 36 has aerators 40a for urging the fly ash to drop through two wedge shaped lower portions 41. The hopper 36 also has vibrators 40 for final evacuation of the wedge shaped lower portions 41 on completion of processing for the day. The top of the hopper 36 is equipped with a baghouse 42 having a dust filter 44 and a vent fan 46. The fan powered baghouse 42 functions to collect dust produced from the hopper due to the dumping and vibrating motion.

As shown in FIG. 2, two variable speed screw conveyors 48 are attached to the hopper 36. Each screw conveyor is attached to a different wedge shaped lower portion of the hopper 36. The conveyors 48 are attached distally from the hopper 36 to a bucket elevator 52 for translating the fly ash in a vertical direction. As the fly ash reaches the top of the elevator 52 it is directed into a custom fly ash conditioner 54.

In a preferred embodiment, the conditioner 54 is equipped with a high density polyethylene liner 56, a polyethelene separator plate 60, paddles 58, aluminum lids 62 and a custom spray nozzle system 64. As the fly ash is conveyed through the conditioner 54, the spray nozzle system 64 deposits a predetermined amount of water into the fly ash.

Next, the wetted fly ash is mixed by the paddles 58 to evenly disburse the water and promote the formation of small agglomerated fly ash granules. The granular fly ash is then allowed to exit the conditioner through an opening 65 into a desired location.

A water supply 66 is connected to the spray nozzles 64 and is equipped with a pressure regulator, air operated shut off valve and manual shut off valve. An air compressor 68 supplies compressed air for pulse cleaning the filter bags and for operating the water valve and for operating the vibrators. An aeration blower 68a supplies aeration air to the aerators 40a.

In a preferred embodiment, the entire apparatus is securely attached to and supported by a trailer 70, so that the apparatus can be easily moved between processing sites.

Further, a programmable controller 110 may be provided for controlling the timing and operating sequence of the conveyors 48, the elevator 52, the water supply 66 and nozzles 64, and the fan 68. As is well known, the controller 110 preferably includes equipment failure interlocks and emergency stop push-buttons. The controller 110 allows either manual or automatic start up and shut down of the apparatus.

Figure 3:
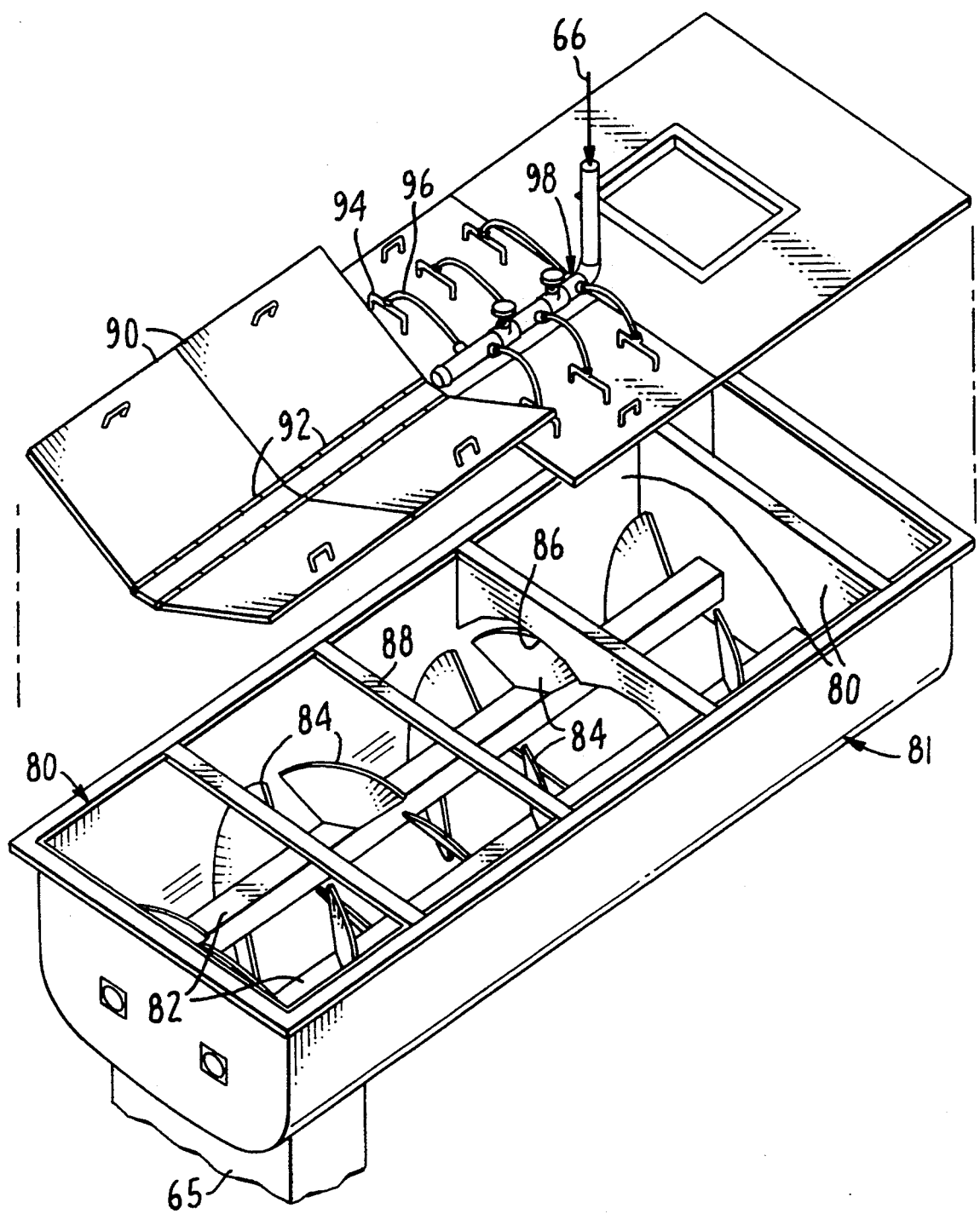
FIG. 3 is a perspective exploded view of a conditioner portion of an embodiment of the present invention.

FIGS. 3-5 illustrate the design of a conditioner portion 79 of an embodiment of the present invention. A tub liner 80, preferably made of ¼" polyethylene sheet, is attached with bolts, nuts and lock washers to the conditioner tub wall 81. Alternatively, nuts, lock washers and studs are welded to the conditioner tub wall.

A paddle shaft wrap 82 is made of polyethylene adhesive tape. Paddle blades 84 are made of 1" polyethylene with ⅜ steel backup plates and ⅜ polyethylene backup plate cover with bolts, nuts and lock washers. A material leveler baffle 86 is made of 2" polyethylene with a scalloped bottom edge to clear the paddles. The baffle 86 is attached with bolts, nuts and lock washers to the support angles.

Door support angles 88 are L3×3 cross members which are welded to the conditioner tub frame. Hinged access cover door assemblies 90 include a ¼" aluminum cover door with a ¼" polyethylene sheet liner which is attached by bolts, nuts and lock washers to the cover door. Access door mounting bar 92 is a ½" steel plate with two continuous hinges. The plate is attached to support angles 88 by bolts, nuts and lock washers.

Dual spray nozzle assembly 94 includes a 1" pipe and fittings with flexible hose connection and specialized spray nozzles extending through the access cover door. Flexible hose 96 is a rubber hose with two hose clamps. Water distribution manifold 98 includes a 3" pipe and fittings with six 1" pipe couplings and flexible hose connections, two 3" manual valves and three ½" pipes. The couplings and specialized spray nozzles are sealed through the access door mounting bar 92.

In operation, dump trucks deliver dry fly ash to the mobile ash conditioning system of the present invention. A low level sensor on the hopper 36 is connected to a light disposed near the hopper curtain 39. The dump truck driver looks for the light in his rear view mirror indicating that the hopper has sufficient remaining capacity to receive a new fly ash load. The dump truck then deposits the load in the hopper and returns to the silo for another load.

The hoppers flexible rubber curtain, pivotal lid which rides up as the truck bed is raised and baghouse having substantial capacity, prevent fugitive dust emissions. The twin variable speed screw conveyors remove fly ash from the hopper. The conveyors are equipped with variable speed drives which are infinitely variable within operating limits and can be adjusted so that ash removal from the hopper is set to the truck delivery cycle. The bucket elevator transports dry fly ash from the screw conveyors to the conditioner, running at a constant speed somewhat faster than the fastest conveyor speed.

In the conditioner the fly ash is wetted and conditioned by controlling and adjusting if necessary the water flow rate in order to provide the correct material condition, and accommodating the ash flow rate set by the screw conveyor. Conditioned ash is discharged from the conditioner outlet 65 and stockpiled for movement by a front end loader or dozer. The apparatus is operated nonstop with a constant feed and discharge.

The claimed invention is not intended to be limited to the preferred embodiments described above. Also claimed are variations of the preferred embodiments which are consistent with the general principles of the present invention as claimed below.

What is claimed is:

1. An ASTM Class C fly ash conditioner comprising:
   a container having a front wall and a back wall, the container having a fly ash intake opening near the front wall and an output opening near the back wall;
   a paddle assembly extending from the container front wall to the container back wall, the paddle assembly including at least one rotatable shaft having a plurality of paddles extending outward and oriented to urge the fly ash from the intake opening to the output opening as the shaft rotates;
   a lid comprising a fly ash receiving portion, a water dispensing portion and an access door, so that when the lid is mounted on top of the container, the fly ash receiving portion is disposed near the container front wall, and the access door is located near the container back wall; and
   a water dispenser including a water distribution manifold and a plurality of hoses attached thereto, each hose being connected to a spray nozzle which is directed into the container, the manifold being mounted on the water dispensing portion of the lid.

2. An apparatus for conditioning fly ash, comprising:
   means for substantially agglomerating fly ash while substantially maintaining the fly ash capacity to act as a solidifying agent; and
   means for continuously conveying a constant amount of fly ash to the agglomerating means;
   wherein the agglomerating means includes a water dispenser, the conveying means having a path, said water dispenser being located at a fixed location along said path so that as fly ash is conveyed past said water dispenser, water is delivered to said fly ash in a pre-determined ratio, and wherein the agglomerating means further includes a conditioner comprising a polyethylene lined tub, a plurality of paddles for mixing and moving the fly ash through the conditioner, and a plurality of spray nozzles connected to the water dispenser for hydrating the fly ash as it translates through the conditioner.

3. A mobile fly ash conditioning apparatus comprising:
   a hopper for receiving fly ash, the hopper having a dust collector vent and fan for capturing and retaining dust, at least one wedge shaped bottom portion equipped with a vibrator, and a flexible curtain being conformable to a dump truck carrier rear end;
   at least one variable speed screw conveyor connected to the bottom portion of the hopper;
   a bucket elevator having a bottom end and a top end, the elevator bottom end being connected to the screw conveyor;
   a water supply;
   a conditioner connected to the elevator top end, the conditioner comprising a polyethylene lined tub, a plurality of paddles for mixing and moving the fly ash through the conditioner, and a plurality of spray nozzles connected to the water supply for hydrating the fly ash as it translates through the conditioner;

a programmable controller for controlling the timing and operating sequence of the conveyor, elevator water supply and fan and allowing automatic and manual start up and shut down of the apparatus, the controller including equipment failure interlocks and emergency stop push-buttons; and a trailer for supporting and allowing transport of the apparatus.

* * * * *